(12) United States Patent
Tsuchiya et al.

(10) Patent No.: US 8,586,150 B2
(45) Date of Patent: Nov. 19, 2013

(54) METHOD FOR PRODUCING PEROVSKITE-STRUCTURE OXIDE

(75) Inventors: Tetsuo Tsuchiya, Tsukuba (JP); Yuki Yamashita, Tokyo (JP); Masato Susukida, Tokyo (JP)

(73) Assignees: National Institute of Advanced Industrial Science and Technology, Tokyo (JP); TDK Corporation, Tokyo (JP)

( * ) Notice: Subject to any disclaimer, the term of this patent is extended or adjusted under 35 U.S.C. 154(b) by 266 days.

(21) Appl. No.: 12/410,029

(22) Filed: Mar. 24, 2009

(65) Prior Publication Data

US 2009/0246405 A1    Oct. 1, 2009

(30) Foreign Application Priority Data

Mar. 31, 2008  (JP) ................................ 2008-093552

(51) Int. Cl.
    *B05D 5/06*    (2006.01)
(52) U.S. Cl.
    USPC ........................ 427/561; 428/469; 428/689
(58) Field of Classification Search
    USPC ........................................................ 427/556
    See application file for complete search history.

(56) References Cited

U.S. PATENT DOCUMENTS

| | | | |
|---|---|---|---|
| 5,472,777 A * | 12/1995 | Kineri et al. ................. | 428/323 |
| 7,029,971 B2 | 4/2006 | Borland et al. | |
| 7,771,531 B2 | 8/2010 | Tsuchiya et al. | |
| 2004/0175585 A1 * | 9/2004 | Zou et al. ...................... | 428/469 |
| 2008/0044673 A1 * | 2/2008 | Miyamoto et al. ............ | 428/469 |
| 2008/0145693 A1 * | 6/2008 | Zou et al. ..................... | 428/611 |

FOREIGN PATENT DOCUMENTS

| | | |
|---|---|---|
| JP | A-2005-39282 | 2/2005 |
| JP | A 2006-523153 | 10/2006 |
| JP | A-2008-28381 | 2/2008 |
| JP | A 2008-044803 | 2/2008 |

OTHER PUBLICATIONS

Nakajima et al., Tomohiko, "28p-ZK-5, Low Temperature Fabrication of Phosphor Oxide Thin Film by Excimer Laser Assisted Metal Organic Deposition," Program of Lecture 54th lecture meeting of The Japan Society of Applied Physics, 2007, p. 1521.

Nakajima et al., Tomohiko, "Low-temperature fabrication of red phosphor Ca0.997Pr0.002TiO3 thin film using excimer laser assisted metal organic deposition," Japanese Journal of Applied Physics, vol. 46, No. 15, 2007, pp. L365-L368.

(Continued)

Primary Examiner — William Phillip Fletcher, III
Assistant Examiner — Jose Hernandez-Diaz
(74) Attorney, Agent, or Firm — Oliff & Berridge, PLC

(57) ABSTRACT

The present invention provides a method for producing a perovskite-structure oxide, with which a highly crystalline oxide layer is formed on a base layer that is metal or the like. The method comprises the steps of: forming, on a base layer, a buffer layer having thermal conductivity lower than thermal conductivity of the base layer; forming a precursor layer of an $ABO_3$-type perovskite-structure oxide comprising Ba at A sites thereof and Ti at B sites thereof on the buffer layer; decomposing the precursor layer, thereby forming an oxide layer comprising Ba and Ti; and annealing the oxide layer by irradiating laser light thereon.

5 Claims, 6 Drawing Sheets

(56) References Cited

OTHER PUBLICATIONS

Nakajima et al., Tomohiko, "Epitaxial Growth of Perovskite Oxide Thin Films by means of ELAMOD," Meeting Abstracts of The Physical Society of Japan, vol. 63, Issue 1, Part 4, Feb. 29, 2008, p. 874.

English-language translation of Notice of Reasons for Rejection issued Jan. 29, 2013 in Japanese Patent Application No. P2008-093552.

* cited by examiner

METHOD FOR PRODUCING PEROVSKITE-STRUCTURE OXIDE

BACKGROUND OF THE INVENTION

1. Field of the Invention

The present invention relates to a method for producing a perovskite-structure oxide.

2. Related Background Art

There is a need to form $ABO_3$-type perovskite-structure oxide layers, such as barium titanate, comprising Ba at A sites thereof and Ti at B sites thereof on base layers such as electrode base layers. To improve dielectric properties of such a perovskite-structure oxide layer comprising Ba and Ti, it is necessary to improve crystallinity by annealing. When an oxide layer comprising Ba and Ti and formed on a base layer made of metal such as copper is annealed at high temperature and high oxygen partial pressure, the base layer unfortunately becomes oxidized. Therefore, it has been recommended that an oxide layer on a base layer be annealed at high temperature and low oxygen partial pressure (Japanese Patent Application Laid-open Publication No. 2005-039282). In addition, an annealing process using an excimer laser is being considered (Japanese Patent Application Laid-open Publication No. 2008-028381).

SUMMARY OF THE INVENTION

However, if oxygen partial pressure is lowered during annealing to suppress oxidation of the base layer, lack of oxygen atoms in the oxide layer will have undesirable effects on electrical properties, such as increasing dielectric loss of the oxide having a perovskite structure comprising Ba and Ti, or causing the oxide layer to become a semiconductor and thereby deteriorating its insulation properties.

In addition, even if annealing of the oxide layer by an excimer laser is attempted, heat of the laser irradiated on the oxide layer easily escapes through the base layer positioned below the oxide layer, making it difficult to selectively and adequately increase temperature of the oxide layer, and consequently problems occur, for example, the oxide being not crystallized sufficiently or the base layer being oxidized.

Accordingly, an object of the present invention is to form a highly crystalline $ABO_3$-type perovskite-structure oxide layer comprising Ba and Ti on a base layer.

The method for producing a perovskite-structure oxide according to the present invention comprises the steps of: forming, on a base layer, a buffer layer having thermal conductivity lower than thermal conductivity of the base layer; forming a precursor layer of an $ABO_3$-type perovskite-structure oxide comprising Ba at A sites thereof and Ti at B sites thereof on the buffer layer; decomposing the precursor layer of the $ABO_3$-type perovskite-structure oxide, thereby forming an oxide layer; and annealing the oxide layer by irradiating laser light thereon.

According to the present invention, heat from the laser irradiated on the oxide layer does not easily escape through the base layer during the annealing step because a buffer layer having thermal conductivity lower than the thermal conductivity of the base layer is provided on the base layer. Consequently, it easy to selectively heat the oxide layer on the buffer layer to an adequate temperature by laser irradiation. A highly crystalline perovskite-structure oxide layer can thereby be formed on a base layer even when the thermal conductivity of the base layer is high.

This base layer preferably is a metal layer or an alloy layer.

A metal layer or an alloy layer is preferable because such a layer can be used as an electrode for a capacitor and the like. Also, most metal layers and alloy layers have high thermal conductivity and thus make the present invention very effective. Furthermore, although metal layers and alloy layers oxidize easily during annealing, oxidation of such layers is also suppressed by the present invention because the layers are covered with a buffer layer.

In addition, the base layer is preferably a Cu layer, an Ag layer, an Au layer or an Al layer.

Cu layers and Al layers have good electrical conductivity, are inexpensive, are easy to post-process and the like, and are particularly useful as electrodes.

In addition, the buffer layer is preferably a conductive layer and more preferably an electrically conductive metal oxide layer. For example, an $In_2O_3$ layer, a ZnO layer, a $SnO_2$ layer, a $SrRuO_3$ layer, an ITO layer, a $LaTiO_3$ layer or a YBCO layer is preferable.

When these conditions are met, since the conductive layer and the perovskite-structure oxide layer are in direct contact, the dielectric properties of the perovskite-structure oxide layer are brought out more effectively than when there is a dielectric layer between the base layer which is an electrode and the perovskite-structure oxide layer.

In addition, the thermal conductivity of the above-mentioned buffer layer at 300K preferably 1 to 80 W/m·K.

When the buffer layer has the thermal conductivity within the above range, heat from the irradiated laser accumulates sufficiently in the oxide layer on the buffer layer, making it particularly easy to crystallize the oxide layer.

According to the present invention, a highly crystalline $ABO_3$-type perovskite-structure oxide layer comprising Ba and Ti can be formed easily on a base layer regardless of the thermal conductivity of the base layer.

DETAILED DESCRIPTION OF THE PREFERRED EMBODIMENTS

A method for producing an $ABO_3$-type perovskite-structure oxide layer comprising Ba at A sites thereof and Ti at B sites thereof according to the present embodiment will be described concretely below with reference to FIGS. 1 to 5. However, the present invention is not limited to the following embodiments.

(Base Layer)

Figure 1:
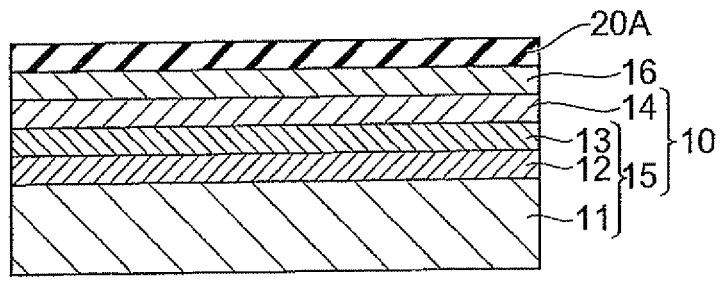
FIG. 1 is a schematic sectional view illustrating a method for producing a perovskite-structure oxide layer comprising Ba and Ti according to an embodiment of the present invention.

First, a base layer 14 is prepared as shown in FIG. 1.

The base layer 14 is a metal layer or an alloy layer usable as an electrode and preferably has a volume resistivity of $10^{-7}$ Ω·m or less. A metal layer such as a Cu layer, an Ag layer, an Au layer or an Al layer, and an alloy layer of the same, can be mentioned as examples. It is particularly preferable to use a Cu layer or an Al layer because the electrical conductivity of these metals is high and also because processing, such as etching, of these metals is simple.

The base layer 14 does not require a base substrate layer 15, shown in FIG. 1, but is preferably formed on the surface of the base substrate layer 15 to maintain crystal orientation. There is no particular limitation on the thickness of the base layer 14, and 100 to 500,000 nm, for example, can be employed.

Although there is no particular limitation on the kind of material used for the base substrate layer 15, a semiconductive layer such as Si, GaAs, GaP, InP or SiC; an oxide layer such as $SiO_2$, $Al_2O_3$, MgO or $SrTiO_3$; a metal layer such as Cu, Ni, Fe or an alloy using mainly the same; a ceramic layer such as LTCC (Low Temperature Co-fired Ceramics) or alumina; an organic layer such as a glass epoxy resin layer (for example, FR4) and a PET film can be mentioned as examples.

In addition, for the base substrate layer 15, one or a plurality of base substrate layers is formed, such as a metal oxide layer such as MgO, ITO, ZnO or $SnO_2$, or a metal layer such as Au, Pt, Ag, Ir, Ru, Co, Ni, Fe, Cr, or Al. This base substrate layer can easily be formed, for example, by oxidizing a layer located at the bottom of the layers forming this base substrate layer or by laminating a layer other than the bottom layer by a method such as sputtering.

The base substrate layer 15 is preferably formed by laminating a metal oxide layer 12 comprising approximately 5 to 2000 nm $SiO_2$ or the like and a metal layer 13 comprising approximately 1 to 100 nm Cr or the like in this order on semiconductive layer 11 comprising approximately 0.1 to 5 mm Si or the like, as shown in FIG. 1. Adhesiveness of the metal oxide layer 12 and the base layer 14 that is a metal layer or the like formed on the base substrate layer 15 by a method such as sputtering can thereby be further improved. A $SiO_2$ layer can be formed by heating an Si substrate to a high temperature in an oxidizing atmosphere. Also, a Cr layer can be formed by a method such as sputtering.

(Formation of Buffer Layer)

Next, a buffer layer 16 is formed on the base layer 14. There is no particular limitation on the kind of material used for the buffer layer 16 as long as the material has the thermal conductivity lower than that of the base layer 14. The thermal conductivity of the buffer layer at 300 K is preferably 1 to 80 W/m·K. The buffer layers having the thermal conductivity greater than 80 W/m·K easily transmit heat, and consequently heat from the irradiated laser is not accumulated in the oxide layer (described in detail below) above the buffer layer, and it tends to be difficult to crystallize the oxide layer.

The buffer layer material is preferably a conductor and preferably has a resistivity of $10^{-3}$ Ω·m or less. Electrically conductive metal oxides such as $In_2O_3$, ZnO, $SnO_2$, $SrRuO_3$, ITO, $LaTiO_3$ and YBCO can be mentioned as examples of such a material. Such an electrically conductive metal oxide not only impedes transmission of heat from the irradiated laser to the underlying base layer 14 but can also be used as an electrode. For example, in a buffer layer of a capacitor having an electrode-layer/perovskite-structure oxide layer comprising Ba and Ti/buffer-layer/electrode-layer configuration, the excellent dielectric properties of the perovskite-structure oxide layer comprising Ba and Ti can be sufficiently brought out even though the buffer layer is in direct contact with the perovskite-structure oxide layer because the buffer layer has electrical conductivity. Furthermore, when the buffer layer is used as an electrode, a minute amount of dopant can be doped into the electrically conductive metal oxide to improve electrical conductivity. Moreover, conductivity of the buffer layer can be improved by inducing oxygen deficiency in the metal oxide of the buffer layer.

In particular, among the above-mentioned materials for the buffer layer 16, ZnO is particularly preferably because it has high electrical conductivity and can be formed into a film at low temperature. It is particularly preferable to form a 100 to 700 nm ZnO layer. A ZnO layer can be formed into a film at a temperature of about 25° C.

The thickness of the buffer layer 16 is preferably 1 to 1000 nm.

The buffer layer 16 can easily be fabricated on the base layer 14 by a process such as CVD method or sputtering method that uses the metal oxide as the target to be formed into a film.

(Formation of Precursor Layer)

Next, a precursor layer 20A of a perovskite-structure oxide comprising Ba and Ti is formed on the buffer layer 16 by a so-called chemical solution process. The chemical solution process forms the precursor layer 20A of a perovskite-structure oxide comprising Ba and Ti by applying a solution comprising a metal alkoxide, a metal organic acid salt, an inorganic metal salt or the like, that is, a solution containing a metal compound that is a precursor raw material of a perovskite-structure oxide comprising Ba and Ti, on a Cu layer 14 by a process such as spin coating, by drying the solution in an oven or the like at 100° C. or less, and by evaporating the solvent.

A metal alkoxide (for example, $Ti(OC_2H_5)_4$, $Ba(OC_2H_5)_2$, $Zr(OC_2H_5)_4$ and $Sr(OC_2H_5)_2$) and a metal organic acid salt (for example, barium 2-ethylhexanoate, zirconyl 2-ethylhexanoate, titanium 2-ethylhexanoate, strontium 2-ethylhexanoate and the like; or a laurate, an acetylacetonate or the like) can be mentioned as examples of a metal compound for a precursor raw material, and a metal nitrate (for example, $Ba(NO_3)_2$ and $Sr(NO_3)_2$), a metal acetate (for example, $Ba(CH_3COO)_2 \cdot H_2O$), and a metal carbonate (for example, $BaCO_3$ and $SrCO_3$) can be mentioned as examples of an inorganic metal salt.

The solution can be formed by mixing these metal compounds in a solvent, each solution may be mixed according to the composition of the perovskite-structure oxide comprising Ba and Ti to be formed, and this mixed solution may be applied on a Cu layer or the like. Toluene, xylene, and an alcohol such as ethanol and methanol can be mentioned as examples of a solvent. Then the precursor layer is formed by drying and then hydrolyzing or condensing the mixed solvent applied on the Cu layer. $BaTiO_3$, $Ba_xSr_{1-x}TiO_3$, $BaZr_xTi_{1-x}O_3$, $BaHf_xTi_{1-x}O_3$, $Ba_xCa_{1-x}TiO_3$ and the like can be mentioned as perovskite-structure oxides comprising Ba and Ti, but it is particularly preferable to form $BaTiO_3$ or $Ba_xSr_{1-x}TiO_3$.

The thickness of the precursor layer 20A of the perovskite-structure oxide comprising Ba and Ti is not particularly limited, but 100 to 5000 nm is preferable.

(Decomposition of Precursor Layer)

Next, a precursor layer of a perovskite-structure oxide comprising Ba and Ti is decomposed, forming an oxide layer. There is no limitation on the kind of decomposition method used here, but some example methods are a method of decomposition by laser irradiation and a method of heating by a heater.

[Decomposition of Precursor Layer of Oxide by Laser Irradiation]

Figure 2:
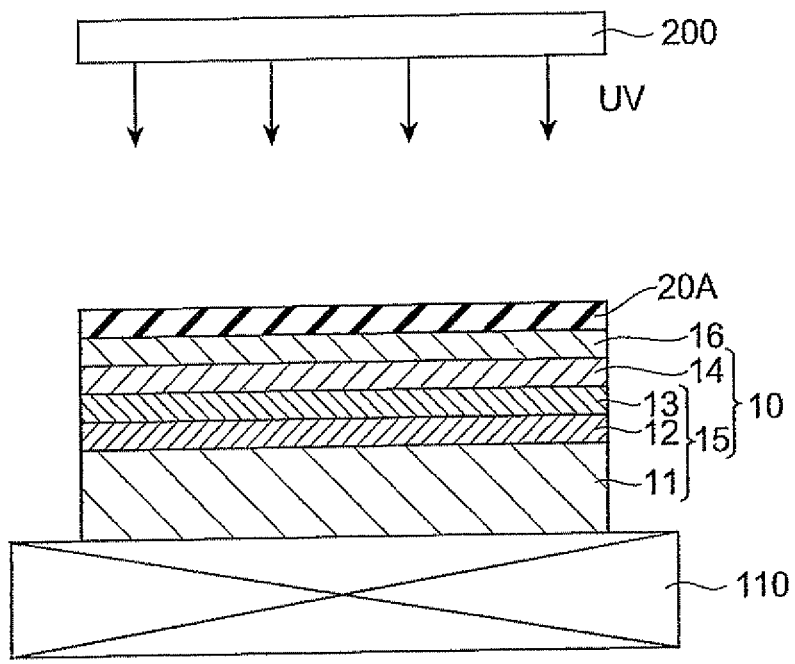
FIG. 2 is a schematic sectional view continued from FIG. 1 illustrating a method for producing a perovskite-structure oxide layer comprising Ba and Ti according to an embodiment of the present invention.

High-energy laser light such as pulsed ultraviolet laser light may be irradiated on the precursor layer 20A of a perovskite-structure oxide comprising Ba and Ti, as shown in FIG. 2. The precursor layer 20A of a perovskite-structure oxide comprising Ba and Ti is thereby decomposed, forming the sufficiently amorphized oxide layer 20B comprising Ba and Ti. The wavelength of the pulsed ultraviolet laser light is 100 to 500 nm and preferably is 100 to 400 nm. Specifically, as pulsed ultraviolet laser light, it is preferable to use excimer laser light using ArF (193 nm), XeCl (308 nm), KrF (248 nm) or the like as a medium.

Irradiation fluence per pulse of the pulsed ultraviolet laser light is preferably 1 to 100 mJ/cm$^2$. Irradiation fluence per pulse of the pulsed ultraviolet laser light is more preferably 10 to 90 mJ/cm$^2$. When irradiation fluence per pulse is less than 1 mJ/cm$^2$, it becomes difficult to form an oxide by decomposing the precursor layer 20A of a perovskite-structure oxide comprising Ba and Ti, and when irradiation fluence per pulse is greater than 100 mJ/cm$^2$, the energy required to decompose the precursor layer and form an amorphous layer is too great and tends to damage the layers. Furthermore, the total number of pulses irradiated on each location of the precursor layer 20A of the perovskite-structure oxide comprising Ba and Ti can be 5 to 50000.

In particular, irradiation of pulsed ultraviolet laser light on the precursor layer 20A of the perovskite-structure oxide comprising Ba and Ti is preferably performed by combining irradiation of pulsed ultraviolet laser light of 1 to 40 mJ/cm$^2$ per pulse and subsequent irradiation of pulsed ultraviolet laser light of 40 to 100 mJ/cm$^2$ per pulse. By changing the irradiation fluence of laser light per pulse in stages during the step for forming the oxide layer 20B comprising Ba and Ti, the energy applied at the beginning of amorphous layer formation can be reduced, making it easy to curb damage to the layer caused by mass generation of gas during thermal decomposition, and the energy applied at the end of amorphous layer formation can be increased, allowing reduction of the amount of undecomposed precursor components.

In particular, it is preferable to irradiate pulsed ultraviolet laser light of 1 to 30 mJ/cm$^2$ per pulse, then irradiate pulsed ultraviolet laser light of 20 to 40 mJ/cm$^2$ per pulse, and finally irradiate pulsed ultraviolet laser light of 40 to 100 mJ/cm$^2$ per pulse. Furthermore, irradiation may also be performed while increasing irradiation fluence per pulse of pulsed ultraviolet laser light continuously instead of increasing irradiation fluence per pulse of pulsed ultraviolet laser light in stages as described above.

Moreover, the pulse frequency (the number of pulses irradiated in a second) is preferably about 1 to 400 Hz and is more preferably about 10 to 300 Hz. In addition, the irradiation duration of a pulse can be 1 to 100 ns.

Also, it is preferable here to irradiate pulsed ultraviolet laser light when the temperature of the precursor layer 20A of the perovskite-structure oxide comprising Ba and Ti is 0 to 400° C. When the precursor layer 20A of the perovskite-structure oxide comprising Ba and Ti is kept at a temperature sufficiently higher than 400° C., the base layer 14 tends to be oxidized easily regardless of the degree of irradiation fluence of the pulsed ultraviolet laser light. On the other hand, when below 0° C., thermal decomposition tends to be difficult.

To attain such a temperature, specifically, amorphization can be performed using an apparatus as shown in FIG. 2. That is, the substrate 10 comprising the buffer layer 16 on the surface thereof and the precursor layer 20A of the perovskite-structure oxide comprising Ba and Ti may be placed on a heating stage 110, the precursor layer 20A of the perovskite-structure oxide comprising Ba and Ti is heated to 0 to 400° C., and laser light from laser light source 200 is irradiated onto the precursor layer 20A of the perovskite-structure oxide comprising Ba and Ti.

Also, there is no particular limitation on the kind of atmosphere used during laser irradiation, and the atmosphere can be a reducing atmosphere, an inert atmosphere or an oxidizing atmosphere, but in order to curb effects on electrical properties of the oxide layer, such as increased dielectric loss due to a lack of oxygen atoms, the laser irradiation is preferably performed in an oxidizing atmosphere and is particularly preferably performed in an oxygen-containing atmosphere such as air.

[Decomposition of Precursor Layer by the Thermal Process Using Heater]

The precursor layer 20A of the perovskite-structure oxide comprising Ba and Ti can also be decomposed without irradiating laser light by keeping the precursor layer in a high-temperature atmosphere. Specifically, the precursor layer is kept at 0 to 400° C. There is no particular limitation on the kind of atmosphere used, and the atmosphere can be a reducing atmosphere, an inert atmosphere or an oxidizing atmosphere, but in order to curb degradation of electrical properties of the oxide layer, such as increased dielectric loss due to deficiency of oxygen atoms in the oxide layer, the heating is preferably performed in an oxidizing atmosphere, and it is particularly preferable to continue heating at 300 to 400° C. for 1 to 30 minutes in an oxygen-containing atmosphere such as air.

Figure 3:
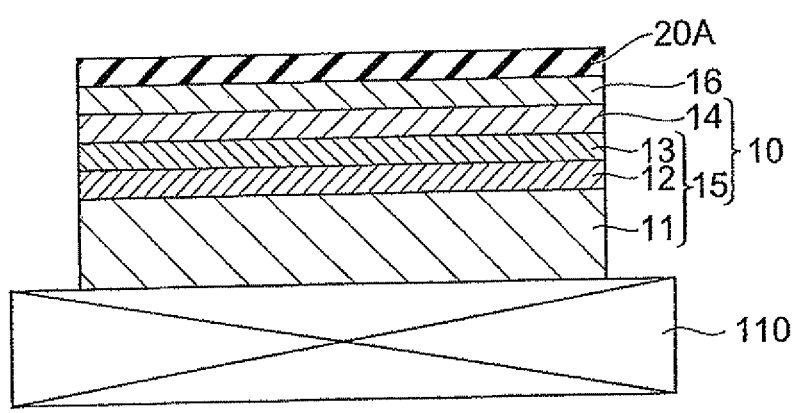
FIG. 3 is a schematic sectional view continued from FIG. 1 illustrating a method for producing a perovskite-structure oxide layer comprising Ba and Ti according to an embodiment of the present invention.

Specifically, as shown in FIG. 3, the substrate 10 comprising the buffer layer 16 on a surface thereof and the precursor layer 20A of the perovskite-structure oxide comprising Ba and Ti may be mounted on a heating stage 110 and heated. The precursor layer 20A of the perovskite-structure oxide comprising Ba and Ti may be heated for 1 to minutes at 300 to 400° C. The precursor layer 20A of the perovskite-structure oxide comprising Ba and Ti is thereby heated and decomposed, forming partially an amorphized oxide layer 20B comprising Ba and Ti.

Figure 4:
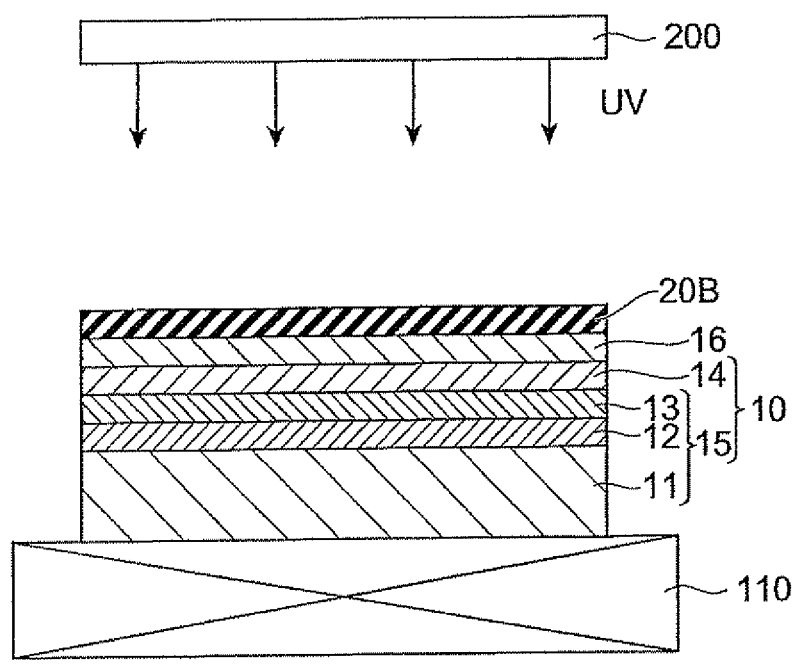
FIG. 4 is a schematic sectional view continued from FIG. 2 and FIG. 3 illustrating a method for producing a perovskite-structure oxide layer comprising Ba and Ti according to an embodiment of the present invention.

The oxide layer 20B having a prescribed thickness and comprising Ba and Ti is thereby formed, as shown in FIG. 4. It is also possible to form, on the buffer layer 16, a normally amorphous oxide layer comprising a plurality of laminates of the oxide 20B comprising Ba and Ti, by forming the oxide layer 20B comprising Ba and Ti a plurality of times by the combination of formation of the precursor layer 20A of a perovskite-structure oxide comprising Ba and Ti and decomposition of the precursor layer 20A.

(Annealing of Oxide Layer)

Next, as shown in FIG. 4, the oxide layer 20B comprising Ba and Ti is annealed by irradiation of high-energy laser light such as pulsed ultraviolet laser light, the oxide is crystallized, and a perovskite-structure oxide layer comprising Ba and Ti is thereby formed. The wavelength of the pulsed ultraviolet layer light is 100 to 500 nm and is preferably 100 to 400 nm. Specifically, it is preferable to use excimer laser light using ArF (193 nm), XeCl (308 nm), KrF (248 nm) or the like as a medium. Laser irradiation conditions in the annealing step of the oxide layer 20B comprising Ba and Ti, that is, temperature of the oxide layer during laser irradiation, energy per pulse (irradiation fluence) of the pulsed ultraviolet laser light, and total number of pulses of the irradiated pulsed laser are particularly preferably 0 to 400° C., 60 to 400 mJ/cm$^2$, and total pulse number 1 to 10000 shots in the annealing step, regardless of the thermal processing method used in the decomposition step (amorphizing step) of the precursor layer.

Furthermore, the pulse frequency (number of pulses radiated in a second) is preferably about 1 to 400 Hz and more preferably about 10 to 300 Hz. Moreover, the irradiation duration of one pulse can be 1 to 100 ns.

In addition, pulsed ultraviolet laser light is preferably irradiated when the oxide layer 20B comprising Ba and Ti is kept at 0 to 400° C. When this oxide layer 20 B is kept at a temperature sufficiently higher than 400° C., it tends to be easy to oxidize the base layer 14 that is a metal layer or the like even when the buffer layer 16 is provided, regardless of the degree of irradiation fluence of the pulsed ultraviolet laser light. On the other hand, crystallization tends to be difficult at less than 0° C.

In order to attain such a temperature, specifically, the oxide layer 20B comprising Ba and Ti can be crystallized using an apparatus as shown in FIG. 4. That is, it is sufficient to place the substrate 10 comprising the buffer layer 16 on the surface thereof and the oxide layer 20B comprising Ba and Ti on a heating stage 110, to keep the temperature of this oxide layer 20B at 0 to 400° C., and to irradiate the oxide layer 20B with laser light from laser light source 200.

Furthermore, there is no particular limitation on the kind of atmosphere used in the annealing step, and the atmosphere can be a reducing atmosphere, an inert atmosphere, or an oxidizing atmosphere, but in order to curb effects on electrical properties of the oxide layer, such as increased dielectric loss due to a lack of oxygen atoms, the annealing is preferably performed in an oxidizing atmosphere and can also be performed in an oxygen-containing atmosphere, such as air.

Figure 5:
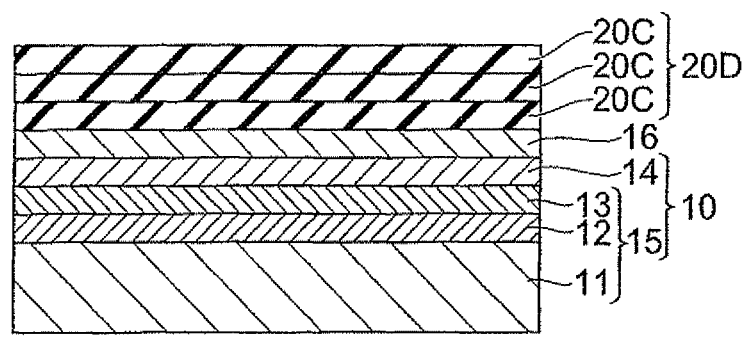
FIG. 5 is a schematic sectional view continued from FIG. 4 illustrating a method for producing a perovskite-structure oxide layer comprising Ba and Ti according to an embodiment of the present invention.
Figure 6:
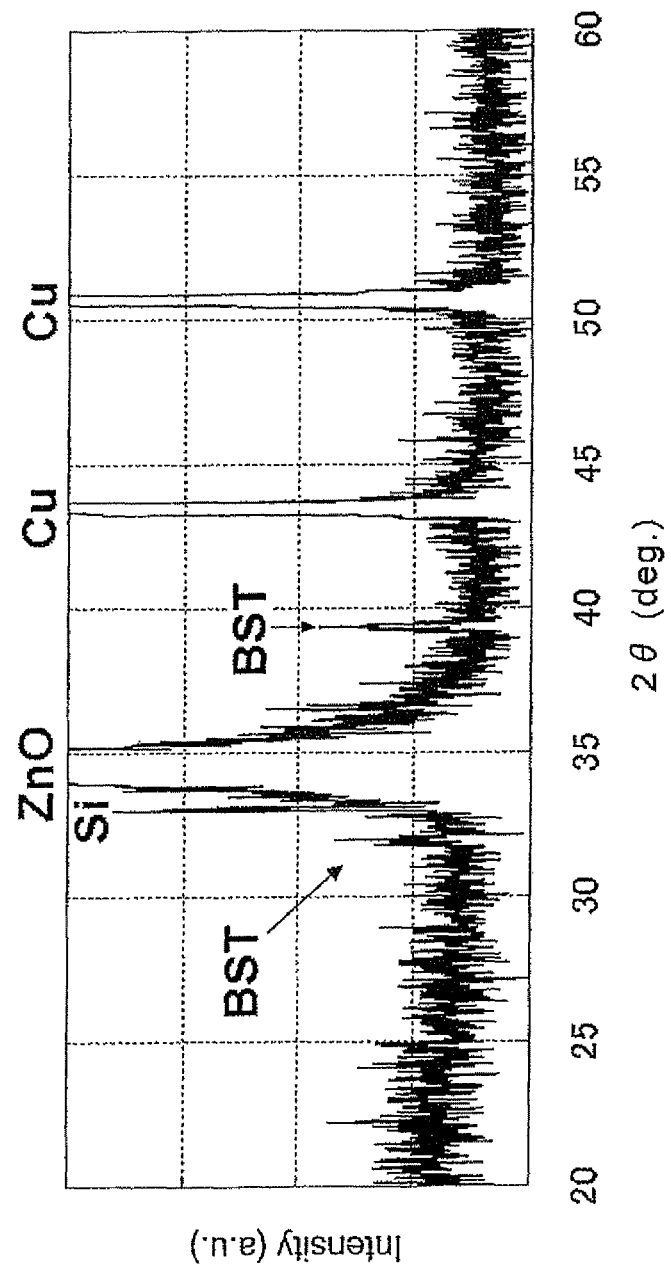
FIG. 6 is an XRD diffraction pattern of a barium strontium titanate layer (Example 3) formed on a substrate comprising a ZnO layer (buffer layer) on the surface thereof.

By multiple repetition of the above-mentioned series of steps comprising forming a precursor layer 20A of an oxide, decomposing the precursor layer 20A of an oxide, and annealing the oxide layer 20B, it is possible to perform multiple lamination of the perovskite-structure oxide layer 20C comprising Ba and Ti, thereby forming relatively thick 20D, as shown in FIG. 5.

In addition, although the step for decomposing (amorphizing) the precursor of the perovskite-structure oxide and the step for annealing the oxide are performed distinctly separately here, the decomposition step and the annealing step can be performed continuously by irradiating the precursor layer with laser light having a sufficiently strong irradiation fluence.

According to the present embodiment, heat from the laser irradiated on the oxide layer 20B comprising Ba and Ti does not easily escape to the base layer 14 during annealing because the buffer layer 16 having the thermal conductivity lower than the thermal conductivity of the base layer 14 is provided on the base layer 14. Therefore, the oxide layer 20B comprising Ba and Ti can be selectively heated to a sufficiently high temperature, and a dielectric having excellent properties such as a highly crystalline barium titanate or strontium barium titanate can be formed even when the thermal conductivity of the base layer 14 is high.

Furthermore, even when the base layer 14 is easily oxidized, oxidation of the base layer can be suppressed because the base layer 14 is covered by the buffer layer 16.

The perovskite-structure oxide layers 20C and 20D comprising Ba and Ti obtained by the above production method are highly crystalline and are therefore suitable for use as a thin-film capacitor element or the like. In particular, an electronic device having a laminated body configured with a conductive layer such as a Cu layer further formed on this perovskite-structure oxide layer 20D comprising Ba and Ti and with the perovskite-structure oxide layer 20D comprising Ba and Ti pinched between this pair of Cu layers (electrode layers) 14 can be used not only for a thin-film capacitor but also for a device such as a FeRAM or tunable filter.

Next, the present invention will be described in further detail with specific examples. However, the present invention is not limited to the following examples.

Example 1

First, a 10 nm Cr layer was formed by sputtering on a polycrystal Si substrate having a 500 nm thermally oxidized layer formed on a surface thereof, and then a 200 nm Cu layer was formed as a base layer on the Cr layer by sputtering.

Next, a 300 nm ZnO layer was formed as a buffer layer on the Cu layer by sputtering.

Next, a stock liquid (BST thin film forming agent, manufactured by Mitsubishi Materials Corp.) containing 7 wt % titanium, barium, and strontium in terms of BST for forming a barium strontium titanate layer was applied on the ZnO surface by a spin coater (3000 rpm, 15 sec) and dried for 5 minutes at 100° C. on a hot plate, thereby forming a barium strontium titanate precursor layer.

Next, in an air atmosphere, with the substrate temperature kept at 100° C. on a hot plate, a pulsed laser from a KrF pulsed laser source was irradiated on the barium strontium titanate precursor layer at a pulse frequency (number of pulses irradiated in a second) of 30 Hz while the irradiation energy per pulse was increased in three steps. A laser was irradiated on the barium strontium titanate precursor layer with the total pulse number in each step set to 5000 shots and with the irradiation energy per pulse increased stepwise in the order of 20 mJ/cm$^2$, 30 mJ/cm$^2$ and 50 mJ/cm$^2$, giving a total pulse number of 15000 shots, and an oxide layer comprising titanium, barium and strontium was obtained.

While the substrate temperature was kept at 100° C., a pulsed ultraviolet laser was irradiated onto every location of this oxide layer from a KrF pulsed laser source with an irradiation energy per pulse of 90 mJ/cm$^2$, a total pulse number of 5000 shots, and a pulse frequency (number of pulses irradiated in a second) of 30 Hz, forming a crystalline barium strontium titanate layer (about 45 nm thick) on the ZnO layer.

Example 2

A crystalline barium strontium titanate layer (about 45 nm thick) was formed on a ZnO layer as in Example 1, except that a KrF pulsed laser having an irradiation energy of 100 mJ/cm$^2$ per pulse was irradiated onto an oxide layer comprising titanium, barium and strontium on a hot plate.

Example 3

A crystalline barium strontium titanate layer (about 45 nm thick) was formed on a ZnO layer as in Example 1, except that a KrF pulsed laser having an irradiation energy of 110 mJ/cm$^2$ per pulse was irradiated onto an oxide layer comprising titanium, barium and strontium.

Example 4

A crystalline barium strontium titanate layer (about 45 nm thick) was formed on a ZnO layer as in Example 1, except that a KrF pulsed laser having an irradiation energy of 130 mJ/cm$^2$ per pulse was irradiated onto an oxide layer comprising titanium, barium and strontium and the total pulse number of the irradiated laser was 1000 shots.

Comparative Example 1

A barium strontium titanate layer (about 45 nm thick) was formed as in Example 1, except that no ZnO layer was formed on the Cu layer. After the laser irradiation, the barium strontium titanate layer on the ZnO layer was not crystallized.

Comparative Example 2

A barium strontium titanate layer (about 45 nm thick) was formed as in Example 2, except that no ZnO layer was formed on the Cu layer. After the laser irradiation, the barium strontium titanate layer on the ZnO layer was not crystallized.

Comparative Example 3

A barium strontium titanate layer (about 45 nm thick) was formed as in Example 3, except that no ZnO layer was formed on the Cu layer. After the laser irradiation, the barium strontium titanate layer on the ZnO layer was not crystallized.

Comparative Example 4

A barium strontium titanate layer (about 45 nm thick) was formed as in Example 4, except that no ZnO layer was formed on the Cu layer. After the laser irradiation, the barium strontium titanate layer on the ZnO layer was not crystallized.

TABLE 1

| | Heating temp/ °C. | Buffer layer | Metal layer | Total pulse number | Irradiation fluence/ mJ/cm$^2$ | Result |
|---|---|---|---|---|---|---|
| Example 1 | 100 | ZnO | Cu | 5000 | 90 | crystallized |
| Example 2 | 100 | ZnO | Cu | 5000 | 100 | crystallized |
| Example 3 | 100 | ZnO | Cu | 5000 | 110 | crystallized |
| Example 4 | 100 | ZnO | Cu | 1000 | 130 | crystallized |
| Comparative Example 1 | 100 | none | Cu | 5000 | 90 | not crystallized |
| Comparative Example 2 | 100 | none | Cu | 5000 | 100 | not crystallized |
| Comparative Example 3 | 100 | none | Cu | 5000 | 110 | not crystallized |
| Comparative Example 4 | 100 | none | Cu | 1000 | 130 | not crystallized |

What is claimed is:

1. A method for producing a perovskite-structure oxide, comprising the steps of:
    forming, on a base layer, a buffer layer of ZnO, the buffer layer having a thermal conductivity lower than a thermal conductivity of the base layer;
    forming a precursor layer of an ABO$_3$-type perovskite-structure oxide comprising Ba at A sites thereof and Ti at B sites thereof directly on the buffer layer, the precursor containing a metal organic acid salt or a metal acetate;
    decomposing the precursor layer of the ABO$_3$-type perovskite-structure oxide, thereby forming an oxide layer; and
    annealing the oxide layer by irradiating pulsed ultraviolet laser light thereon, the oxide layer being kept at 0 to 400° C. during the annealing.

2. The method for producing a perovskite-structure oxide according to claim 1, wherein the base layer is a metal layer or an alloy layer.

3. The method for producing a perovskite-structure oxide according to claim 1, wherein the base layer is a Cu layer, an Ag layer, an Au layer or an Al layer.

4. The method for producing a perovskite-structure oxide according to claim 1, wherein the annealing step is performed in an oxygen-containing atmosphere.

5. The method for producing a perovskite-structure oxide according to claim 4, wherein the oxygen-containing atmosphere is air.

* * * * *